United States Defensive Publication [19] (H) [11] T103,701

Tuller et al. [43] Dec. 6, 1983

[54] NUCLEATED POLYESTER COMPOSITION CONTAINING RED PHOSPHORUS

[76] Inventors: Harold W. Tuller, Jones La., Long Valley, N.J. 07853; Nicholas Vanderkooi, Jr., 8 Van Riper Ave., Pompton Plains, N.J. 07444; John C. Haylock, 153 Conestoga Ter., Sparta, N.J. 07871; Theodore Largman, 7 Upper Field Rd., Morristown, N.J. 07960

[21] Appl. No.: 455,341

[22] Filed: Jan. 3, 1983

[51] Int. Cl.[3] ..... C08K 3/02

[52] U.S. Cl. ..... 524/293; 524/80; 524/605

[57] ABSTRACT

A polyester composition comprising the salt of a dimer acid, trimer or salt of a mixture of dimer acid and trimer acid, and from 0.5 to 10 percent fine particulate red phosphorous. The salt is preferably the sodium salt of the dimer and/or trimer acids. Alternately, the salt can be the sodium salt of an organic polymer having pendant carboxyl groups. The red phosphorous can contain a phosphine suppressant such as a metal hydroxide or copper compound. The preferred red phosphorous used is believed to be coated with an aliphatic polyamine and bisphenol A, epichlorohydrin condensate, reacted with acrylonitrile and ethylene oxide produced by American Hoescht as Exolite *TM*405. The composition can contain a filler, plasticizer, impact modifier, and/or a polyepoxide.

29 Claims, No Sheets Drawing,

32 Pages Specification

The file of this unexamined application may be inspected and copies thereof may be purchased (849 O.G. 1221, Apr. 9, 1968).